Patented Feb. 16, 1937

UNITED STATES PATENT OFFICE 2,070,848

METHOD FOR PREPARING ALIPHATIC-AROMATIC ETHERS

Waldo L. Semon, Silver Lake, and Robert V. Yohe, Akron, Ohio, assignors to The B. F. Goodrich Company, New York, N. Y., a corporation of New York No Drawing. Application December 12, 1934, Serial No. 757,170

5 Claims. (Cl. 260—128)

This invention relates to the preparation of aliphatic-aromatic ethers, and has as its chief object the provision of an improved method for preparing such ethers.

Heretofore aliphatic-aromatic ethers have been prepared by heating an alkyl iodide with an alkali metal phenolate in alcohol solution. The alkyl iodides however are quite expensive, and the yields at best have been only in the neighborhood of 70% of the theoretical.

We have now discovered that aliphatic halides generally, including particularly the chlorides, as well as the bromides and iodides, will react with alkali metal phenolates in aqueous solution to give very high, practically quantitative, yields of the desired aliphatic-aromatic ethers.

The process of this invention may be employed in the production of many specifically different ethers, of which the aliphatic portion may be a simple alkyl group, an alkylene group, a cycloaliphatic or aralkyl group, or even a substituted group, provided that the substituent is relatively unreactive or of such a nature that it will not interfere in the reaction, and the aromatic portion may be an aryl group or a substituted aryl group, provided again that the substituent is not too reactive.

For example, methyl chloride, ethyl chloride, propyl chloride, isopropyl chloride, butyl chloride, isobutyl chloride, secondary butyl chloride, tertiary butyl chloride, the various amyl, hexyl, heptyl, decyl, dodecyl, and hexadecyl chlorides, cyclopentyl chloride, cyclohexyl chloride, benzyl chloride, phenyl ethyl chloride, methylene dichloride, ethylene dichloride, propylene dichloride, trimethylene dichloride, butylene dichloride, tetramethylene dichloride, chlorhydrin, 2 chlor diethyl ether, 2, 2' dichlor diethylether, 2 chlor ethyl amine, or the corresponding bromides or iodides may be reacted with a sodium or other alkali metal salt of phenol, ortho, meta or para cresol, the various xylenols, thymol, carvacrol, ortho or para phenyl phenol, alpha or beta naphthol, anthrol, anthranol, resorcinol, catechol, hydroquinone, guaicol, chlorphenol, nitrophenol, dimethyl aminophenol, phenyl aminophenol, tolylaminophenol, phenylaminocresol, cumylaminophenol, naphthylaminophenol, phenylaminonaphthol and the like to produce the desired ethers.

As a specific example of one embodiment of the method, 185 parts by weight of p-hydroxy diphenylamine (1 mol.), an equivalent quantity—about 86 parts—of 46% caustic soda solution (1 mol.), and 86 parts of isopropyl chloride (1.1 mol.), are introduced into an autoclave and heated with agitation for 3 hours at 100° C. The charge is then removed, the oily material is washed with hot water, and purified by distillation. The yield of p-isopropoxy diphenylamine is about 90% of that theoretically possible, the remaining 10% being accounted for largely by unreacted p-hydroxy diphenylamine which may be recovered and used in the next batch. Other aliphatic-aromatic ethers may similarly be prepared in excellent yields by substituting the appropriate aliphatic halides and phenols for those just recited. Thus phenetol may be prepared from ethyl chloride and phenol, secondary butyl phenyl ether from secondary buty chloride and phenol, the corresponding naphthyl ethers from the alkyl chlorides and naphthol, p,p'dianilino diphenoxy ethane from ethylene dichloride and p-hydroxy diphenylamine, etc.

In this process it is generally advisable to agitate the reaction mixture as vigorously as is conveniently possible, for the aliphatic chlorides are generally not miscible with the remainder of the reaction mixture and will not undergo the desired reaction unless brought into intimate contact therewith. The time and temperature of heating may obviously be varied, a shorter time being required if a higher temperature is employed. For example, temperatures of 125 to 150° C. or even higher give very good results.

It is to be understood that numerous modifications of the process described above may be effected without exceeding the scope of the invention as defined in the appended claims.

We claim:

1. The method of preparing aliphatic ethers of arylaminophenols which comprises heating an aliphatic chloride with an arylaminophenol in an aqueous alkaline solution.

2. The method of preparing alkoxy diarylamines which comprises heating an alkyl chloride with an arylaminophenol in an aqueous alkaline solution.

3. The method of preparing p-isopropoxy diphenylamine which comprises heating isopropyl chloride with p-hydroxy diphenylamine in an aqueous alkaline solution.

4. The method of preparing aliphatic bis-ethers of phenols which comprises heating an aliphatic dihalide with an arylaminophenol in an aqueous alkaline solution.

5. The method of preparing p,p'dianilino diphenoxy ethane which comprises heating ethylene dichloride with p-hydroxy diphenylamine in an aqueous alkaline solution.

WALDO L. SEMON.
ROBERT V. YOHE.